June 30, 1942.  W. R. POSTLEWAITE ET AL  2,287,826
MASTIC NOZZLE FOR COATING PIPE
Filed July 25, 1939  3 Sheets-Sheet 1

INVENTORS
RODNEY A. VERTREES
WILLIAM R. POSTLEWAITE
BY
ATTORNEY

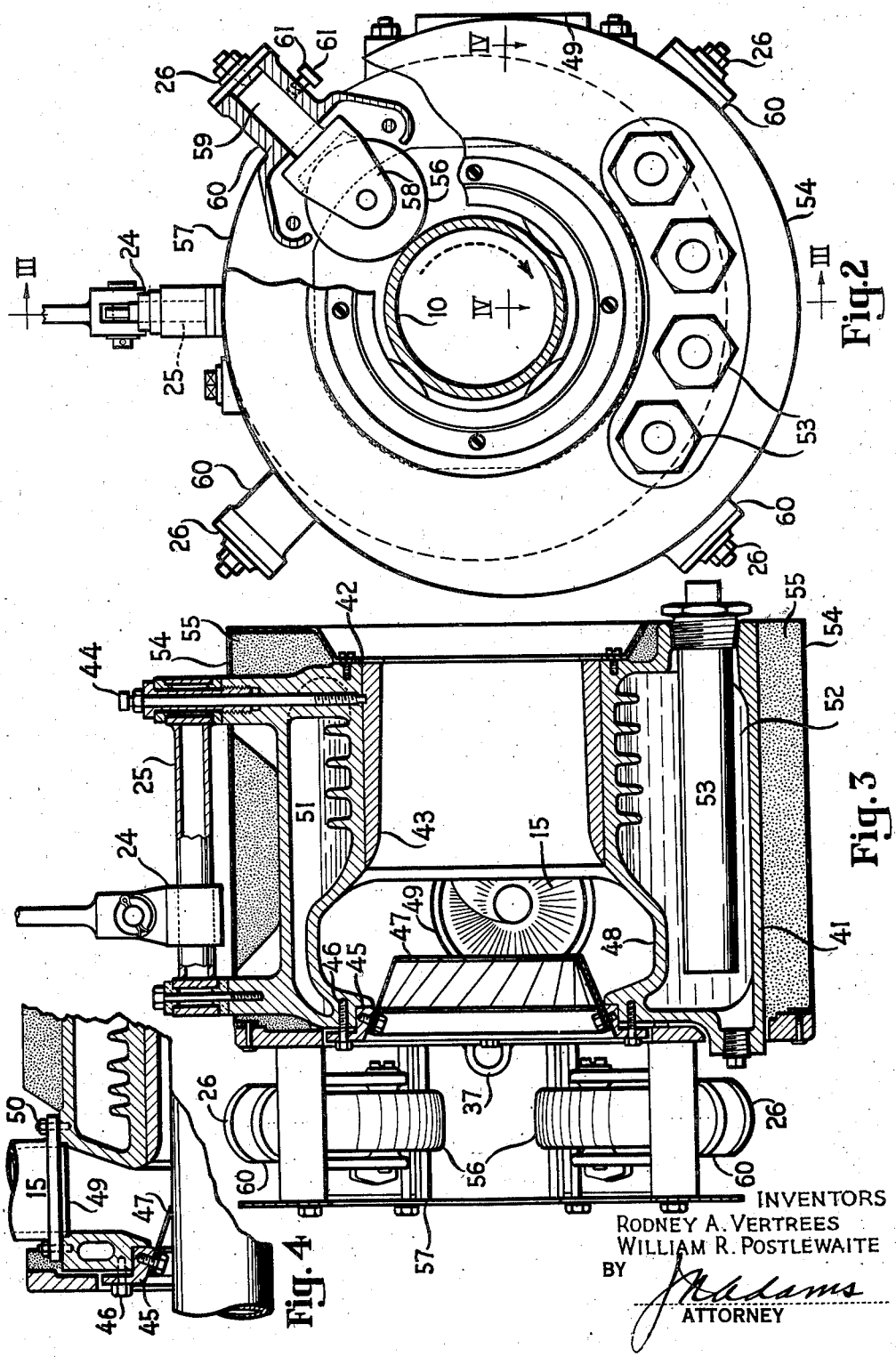

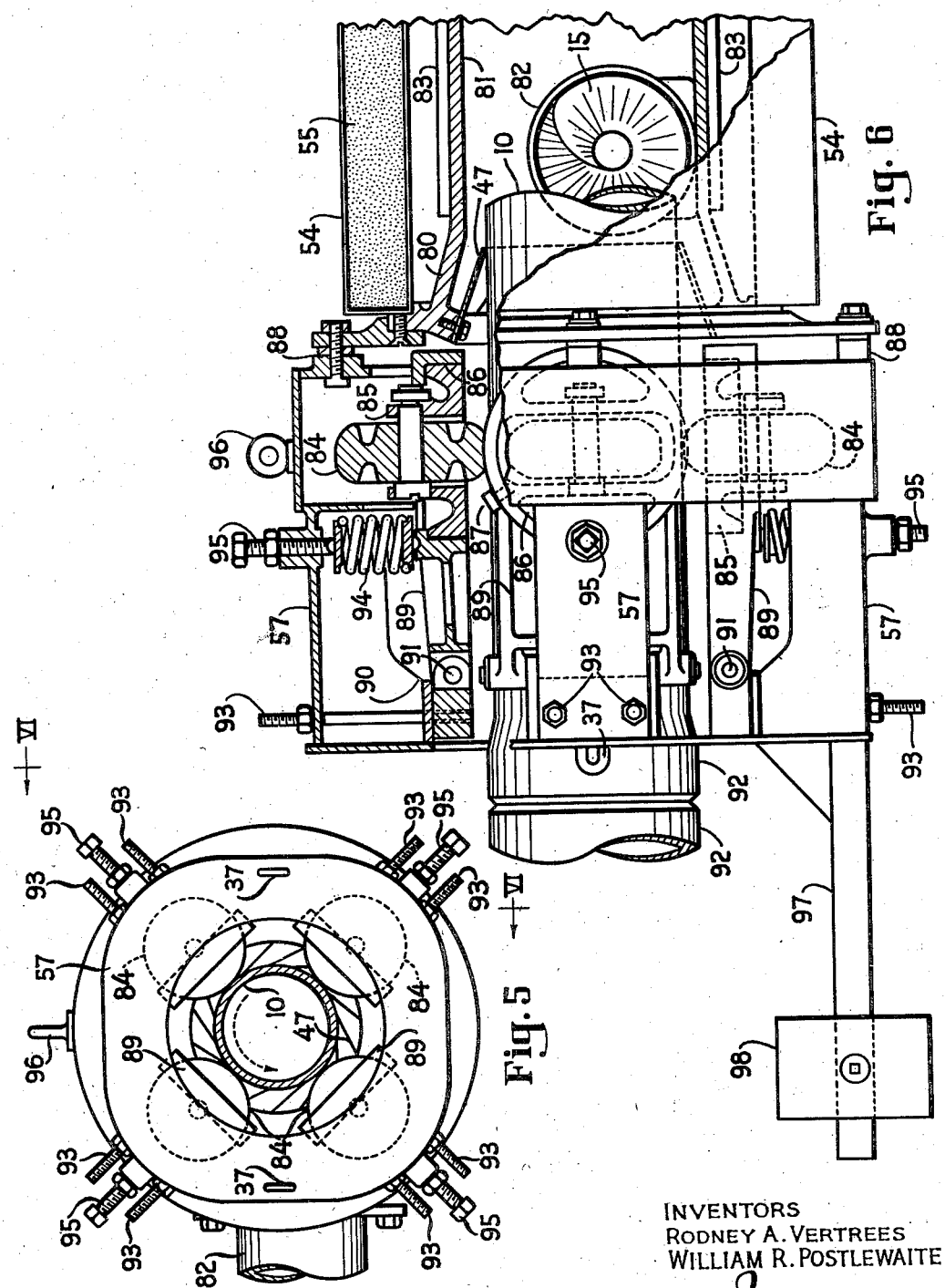

Patented June 30, 1942

2,287,826

UNITED STATES PATENT OFFICE 2,287,826

MASTIC NOZZLE FOR COATING PIPE

William R. Postlewaite and Rodney A. Vertrees, San Francisco, Calif., assignors to Standard Oil Company of California, San Francisco, Calif., a corporation of Delaware Application July 25, 1939, Serial No. 286,428

5 Claims. (Cl. 25—38)

This invention relates to apparatus for continuously applying a thick layer of plastic material, such as a bituminous or cementitious mastic to form a coating on a pipe or the like which is being advanced helically, and particularly relates to an improved form of the extrusion apparatus shown and claimed in the W. R. Postlewaite Patent No. 2,040,876, issued May 19, 1936, and entitled "Pipe coating apparatus."

This apparatus is characterized by the provision of an extrusion nozzle adapted to surround the pipe to be coated and to be supplied with the plastic coating material or mastic, which includes any sort of initially plastic material that will eventually harden and may be that of the McDonald et al. Patent No. 1,984,649, issued December 18, 1934, which comprises a graded mineral aggregate and a small proportion of a bituminous substance such as asphalt. This coating material is only slightly plastic even at temperatures of 250° to 400° F. and is preferably forced under considerable pressure into the inlet of the encircling nozzle by an impeller, screw pump or other means. A flexible sealing member at the inlet side of the nozzle prevents loss of mastic outwardly along the incoming pipe, and the inwardly tapered outlet side of the nozzle is spaced outwardly from the pipe wall and is concentric thereto to define the thickness of the coating, which may range from about ¼ inch to about ¾ inch.

One particular improvement in this apparatus over that heretofore disclosed and used is in the provision for balancing and supporting the nozzle to permit it to move freely with irregularities in the pipe axis, which is often bent or crooked, particularly when it is in long lengths or has previously been used in a pipe line. Another improvement is in the centralizing means for aligning the nozzle with the axis of that portion of the pipe which it encircles at any given time, so that the coating will be truly concentric, or of uniform thickness around the pipe circumference, and so that objectionable ripples or waves in the coating will be prevented. This is accomplished, not by increasing the number of guide means or radially extending rollers or the like, but by decreasing the number of such elements, balancing the nozzle about its support, and utilizing the equalizing effect of the extruding mastic itself, as will be pointed out in more detail below.

Another substantial improvement is in the provision of radially outwardly movable supports that will permit the coating of pipe with enlarged or bell ends, without changing the axial alignment of the nozzle or stopping the application of the coating to the pipe.

Another improvement is in the provision of a flexible drive connection and support for the mastic pump or its equivalent, that will permit it to weave or move about with the nozzle and, at the same time, will not interfere with the free motion of the latter, so that a smooth and uniform coating will be applied to the pipe.

These and other objects and advantages will be further apparent from the following description and from the accompanying drawings, which form a part of this specification and illustrate a preferred embodiment of the invention, together with modifications which may be made in several parts of it.

In the drawings:

Figure 2 is a vertical, end-elevational view, partly in section, showing the outlet side of the nozzle of Figure 1.

Figure 3 is a vertical, sectional view on line III—III of Figure 2 and illustrates an improved sealing means for the pipe inlet to the nozzle as well as one form of supporting means.

Figure 4 is a horizontal, sectional view on line IV—IV of Figure 2, showing the mastic inlet to the nozzle.

Figure 5 is a vertical, end-elevational view of the pipe inlet end of an alternative form of nozzle and aligning means therefor.

Figure 6 is a part sectional, side-elevational view on line VI—VI of Figure 5, showing an arrangement of radially movable and axially inclined spacing-rollers for handling bell-end pipe.

Figure 1:
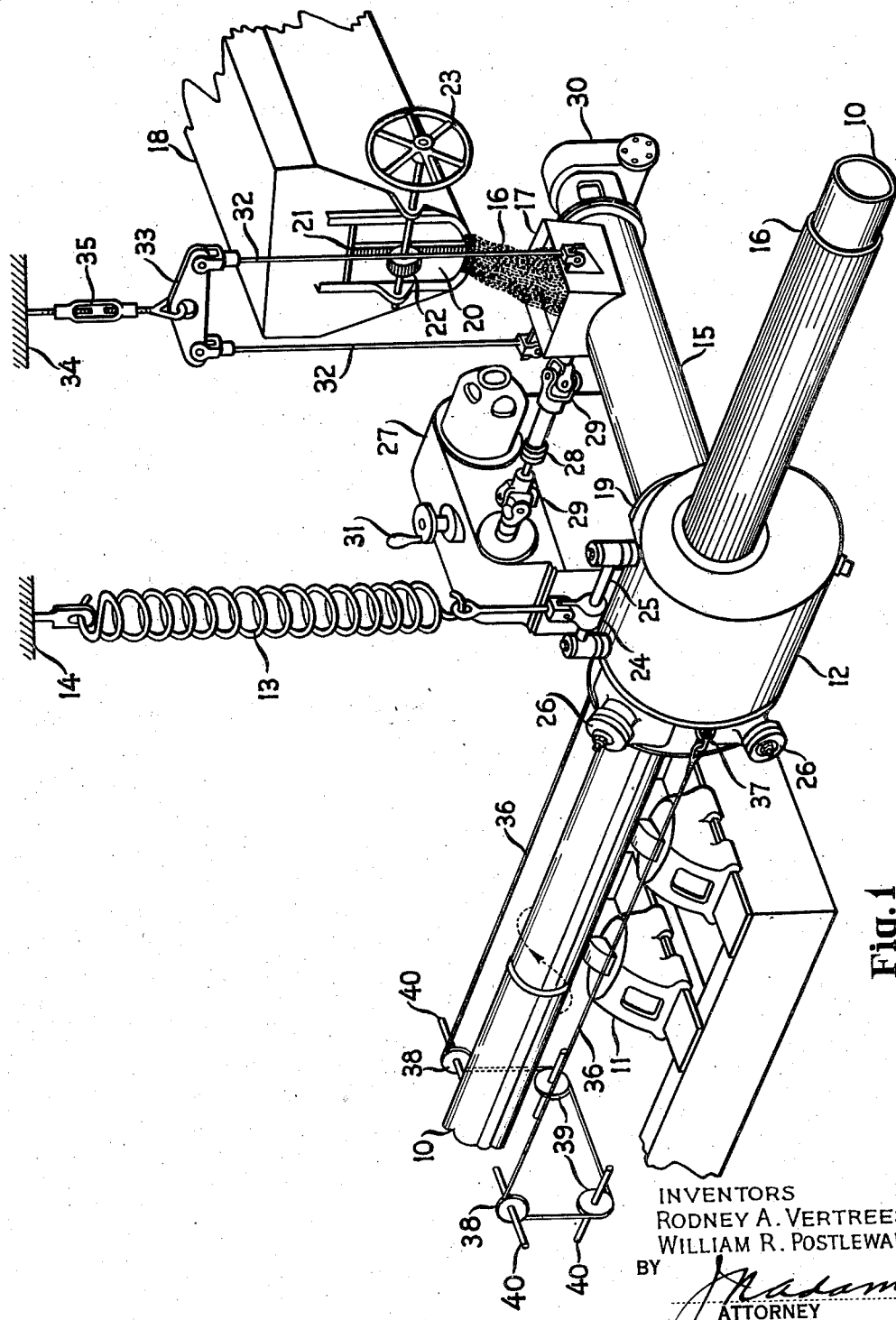
Figure 1 is a perspective view of a nozzle operating on a pipe to be coated, showing a preferred arrangement of the mastic pump drive and nozzle suspension, balancing and holding means.

Referring to the drawings and particularly to the general arrangement of Figure 1, reference numeral 10 designates a length of pipe being supported and helically advanced by suitable means, including skew rollers 11, which may be a part of the helical feed devices described in the copending application of W. R. Postlewaite, Serial No. 148,245, filed June 14, 1937, which issued July 18, 1939 as Patent No. 2,166,608, or the J. F. Putnam Patent No. 2,112,865, issued April 5, 1938.

The nozzle structure generally designated 12 is preferably resiliently adjustably supported by a spring 13 and abutment 14, or by the counterweight arrangement shown in Figure 3 of the W. R. Postlewaite Patent No. 2,040,876. A mastic pump 15, illustrated as a screw feed or axial worm type, is adapted to receive plastic material 16 in inlet hopper 17 from the heated storage or supply chute 18 and to continuously deliver it under considerable pressure to the inlet 19 of the nozzle 12. A gate 20, movable by rack 21, pinion 22 and handwheel 23, serves to control the rate at which mastic is fed into hopper 17 and pump 15.

It will be noted that the connection 24 between spring 13 and nozzle 12 is slidable longitudinally of the nozzle axis, on rod 25. This is desirable for the purpose of balancing the nozzle 12, which is also maintained concentric to the pipe by a single row of rollers generally designated 26, near the pipe inlet end, which arrangement would normally tend to cause the pipe outlet end to tilt downwardly. Such a slidable connection as was just described, or other means such as axially movable weights for balancing the nozzle longitudinally, either of which acts to vary or move the point of support of the nozzle with respect to its center of gravity is desirable to insure a truly concentric finished coating of initially plastic material 16 on pipe 10, without ripples or waves, which might adversely affect the durability of the finished coating.

A variable-speed motor-driven or other form of prime mover generally designated 27 is provided to drive the mastic pump 15, and is preferably flexibly coupled thereto by a longitudinally splined shaft 28, fitted with universal joints 29, which shaft is connected to the conventional axial worm of the mastic pump 15 through a worm gear means 30. Control handle 31 on variable speed drive 27 may be manipulated to coordinate the rate of delivery of the plastic material 16 with the rate of passage of pipe 10 through nozzle 12, so that uniform pressure will be exerted on the material in the nozzle and an adequate supply maintained therein, to prevent voids or porous spots in the finished coating.

In order to support the outer end of mastic pump 15 in a manner that will permit its free movement with nozzle 12 when the latter is twisted about by crooked pipe 10, and also to resist the tendency of the nozzle and pump to rotate with the pipe, a pair of rods 32 are hinged to the hopper 17 and to an equalizing bar 33, supported from abutment 34 by a turnbuckle or other adjusting means 35. The set of rollers generally designated 26 at the pipe inlet end of nozzle 12 are preferably adjusted to the angle of the helix formed by the pipe motion. In order to prevent irregularities in the pipe and friction in the nozzle from moving the nozzle longitudinally of the pipe, a flexible cable 36 is secured to the pipe inlet side of nozzle 12 as by rings 37, and passes around equalizing pulleys 38 and 39 which are journalled on shafts 40 supported in suitable bearings (not shown) on either side of pipe 10.

Thus it will be appreciated that nozzle 12 is mounted on pipe 10 to be resiliently supported, as by spring 13; balanced longitudinally, as by adjustable connection 24 and rod 25 or an equivalent counterweight; restrained from rotation due to the friction of the helically moving pipe 10, as by rods 32 and equalizing bar 33; and restrained from axial motion along the pipe 10, as by cable 36 and equalizing pulleys 38 and 39; all to permit the nozzle accurately to follow certain unavoidable irregular motions of the pipe and to produce a smooth, concentric coating thereon. The weight of the nozzle and pump, particularly for coating large pipe, of 12 inches to 16 inches in diameter, may easily exceed 1,000 pounds and the relative ease with which the still plastic, newly applied coating 16 is deformed makes such provisions desirable if not essential to satisfactory operation.

Referring now to the construction of the nozzle and support shown in Figures 2, 3 and 4, the cylindrical body 41 of nozzle 12 is open at both ends, the pipe outlet portion 42 being bored cylindrically to receive a renewable liner 43, secured therein as by bolt 44. The pipe inlet to body 41 is counterbored to receive a flange 45 secured by screws 46 and carrying a flexible mastic sealing member 47, preferably composed of a plurality of spring steel strips formed to a conical shape and inclined at an angle to the pipe axis, this angle being substantially parallel to the helix angle of the pipe travel through the nozzle. Intermediate bore 42 and the pipe inlet to the nozzle, body 41 is enlarged to form an annular passage 48 communicating with the mastic inlet 49 (Fig. 4), to distribute the coating material uniformly around the circumference, which, together with the helical motion of the pipe, tends to centralize the pipe 10 in the bore of the nozzle liner 43 and so form a uniformly thick concentric coating. Mastic pump 15 may be secured to body 41 as by studs 50.

Body 41 of the nozzle is preferably heated when using thermoplastic materials or mastics which soften at high temperature. In this example, the body is surrounded by a chamber 51 in which is a heat transfer material 52 such as naphthalene, which is liquefied by electric heating elements 53 at a temperature of about 180° F. and which has a low vapor pressure so that it will not set up undue pressures at higher temperatures. A metal jacket 54 filled with suitable heat insulating material 55, such as mineral or rock wool, is desirable for limiting the heat loss from the nozzle body 41.

In order to generally align the nozzle body 41 with the pipe 10 being coated, the support means 26 may comprise a plurality of resiliently faced rollers 56 mounted in a single plane at right angles to the pipe axis, as by frame 57 secured to the inlet side of nozzle body 41, and supported in bearing members 58 to be angularly adjusted in the frame with respect to the pipe and nozzle axis by the cooperation of studs 59 in radial sleeves or collars 60, the latter secured in place by set screws 61. The plane of rotation of the individual rollers 56 is preferably fixed at the helical angle at which the pipe is advanced through the nozzle bore. They are shown at right angles to the pipe axis in Figures 2 and 3 for convenience in making the drawing.

At the top of nozzle 12 is a horizontal rod or bar 25, mentioned above, which is adapted to receive a connector 24, slidable longitudinally of the nozzle axis to balance it and prevent undue disturbance or deformation of the coating layer. The adjustment of this nozzle support is a matter for experimentation and depends upon such variable factors as the relative density of the material being applied, its consistency, the rate of application and other factors which will be appreciated by one skilled in this art.

Referring to the alternative nozzle embodiment shown in Figures 5 and 6 it will be noted that the arrangement is similar in most respects to that just described. The principal differences are in the arrangement of the rollers which partially support the nozzle on the pipe, these being on spring-actuated hinged supports to permit outward motion when coating bell end pipe, and in the provision of a counterbalance or weight on an axially extending bar on the nozzle proper, to permit a more convenient means for balancing the latter with respect to its proportionate bearing on the plane of the rollers and its contact with the newly applied coating.

Nozzle body 80, in this example, is generally simpler than the one previously described and has a slightly tapering bore 81, with the mastic inlet 82 generally tangential to the bore and on that side which faces the helically advancing surface of the pipe 10 to promote the introduction of the mastic. A flexible mastic seal member 47 is positioned at the pipe inlet and is composed of a plurality of spring steel strips formed to a conical shape and inclined at an angle to the pipe axis, this angle being substantially parallel to the helix angle of the pipe travel through the nozzle. The heating element for nozzle body 80 comprises a plurality of strip-type electric resistance elements 83 secured to the outer face and enclosed by a metal jacket 54 and heat insulating material 55.

In this embodiment, rollers 84 do not need to be of resilient material, and are rotatably supported in brackets 85, the latter adapted to be turned to align the plane of rotation of the roller with the helix angle of the pipe by being received in circular seats 86 and retained therein as by set screws 87. Frame 57 extends outwardly from the pipe inlet face of nozzle body 80 and is preferably secured thereto by heat-insulating connectors 88. Brackets 85 and seats 86 are mounted at the outer ends of hinged members 89 which are pivoted as at 90 on hinges 91 to move radially outwardly from the pipe surface when the bell ends 92 of pipe 10 pass through the plane of the rollers 84. Hinges 91 may be secured in frame 57 by means of bolts 93. Springs 94, which may be adjusted by screws 95, keep rollers 84 in contact with the pipe. In this embodiment the support ring 96 for the whole nozzle assembly is preferably located directly above the rollers 84, and may be secured to a suitable abutment by the spring 13 of Figure 1 or the counterweight arrangement of Patent No. 2,040,876. A bar or rod 97 extends outwardly from frame 57 along the pipe axis and is provided with an adjustable weight member 98 to counterbalance the nozzle, as has been explained above.

From the foregoing description it will be appreciated that these improvements are particularly applicable to a pipe coating apparatus of the stationary extrusion type which is adapted to place a thick layer of initially plastic material on a pipe or the like, which is helically advanced relatively thereto, and are characterized by means for axially supporting and balancing the nozzle and the pump or its equivalent used for forcing the material into the nozzle, and at the same time restraining them from axial and rotational movement while providing a fixed independent power source for the pump, all without interfering with the freedom of the pipe to move about or whip due to its axis being crooked or bent. Other improvements are the flexible seal means, which permit the pipe to advance helically into the nozzle without tending to catch or bend the flexible sealing elements, and the provision for supporting the nozzle on the pipe by a set of rollers or their equivalent disposed in a single plane at right angles to the axis of the nozzle and pipe and preferably in the line of that support for the nozzle which absorbs the greater part of its weight and so relieves the pipe and coating from friction and deformation.

Although specific arrangements have been shown and described, it is understood that modifications and changes may be made in the several parts without departing from the invention, and all such that fall within the scope of the appended claims are embraced thereby.

We claim:

1. In a device for applying a mastic coating to pipes or the like which are being advanced relatively thereto to pass into and through said device, an extrusion nozzle having a generally horizontal longitudinal axis, means for supplying mastic into said nozzle to form a relatively thick coating on said pipe, a resilient support for said nozzle acting in a vertical line at right angles to its longitudinal axis, and means for varying the location of the point of support of said nozzle longitudinally along the nozzle axis with respect to the center of gravity of said nozzle so that said nozzle may be balanced to produce a smooth concentric coating on said relatively moving pipe.

2. A device, according to claim 1, in which said last-named means comprises means for adjusting said support longitudinally of the nozzle axis to balance said nozzle on said pipe.

3. A device, according to claim 1, in which said last-named means comprises a counterweight on said nozzle movable longitudinally of said nozzle with respect to said support.

4. A device, according to claim 1, in which said mastic-supplying means extends substantially transversely from said nozzle axis, and including a flexible support for said mastic-supplying means, a rigidly mounted prime mover, and flexible drive means connecting said prime mover with said mastic-supplying means, so constructed and arranged that said nozzle and said mastic-supplying means are free to assume varying angular positions when coating crooked pipe.

5. In a device for applying a mastic coating to pipes or the like which are being advanced helically with respect to said device, an extrusion nozzle, means for supplying mastic into said nozzle to form a relatively thick coating on said pipe, and sealing means at the pipe inlet of said nozzle to prevent loss of mastic therefrom, said sealing means comprising substantially flat, flexible, metallic strips abutting and converging inwardly to contact the pipe and with their longitudinal axes disposed to be substantially parallel to the helix angle of said pipe motion so that irregularities on the pipe being coated will not catch and damage said strips.

WILLIAM R. POSTLEWAITE.
RODNEY A. VERTREES.